J. T. BEEN.
ROTARY ENGINE.
APPLICATION FILED DEC. 18, 1913.

1,176,643.

Patented Mar. 21, 1916.
3 SHEETS—SHEET 1.

Witnesses:
Inventor:
John T. Been
By Peirce, Fisher & Clapp
Attys.

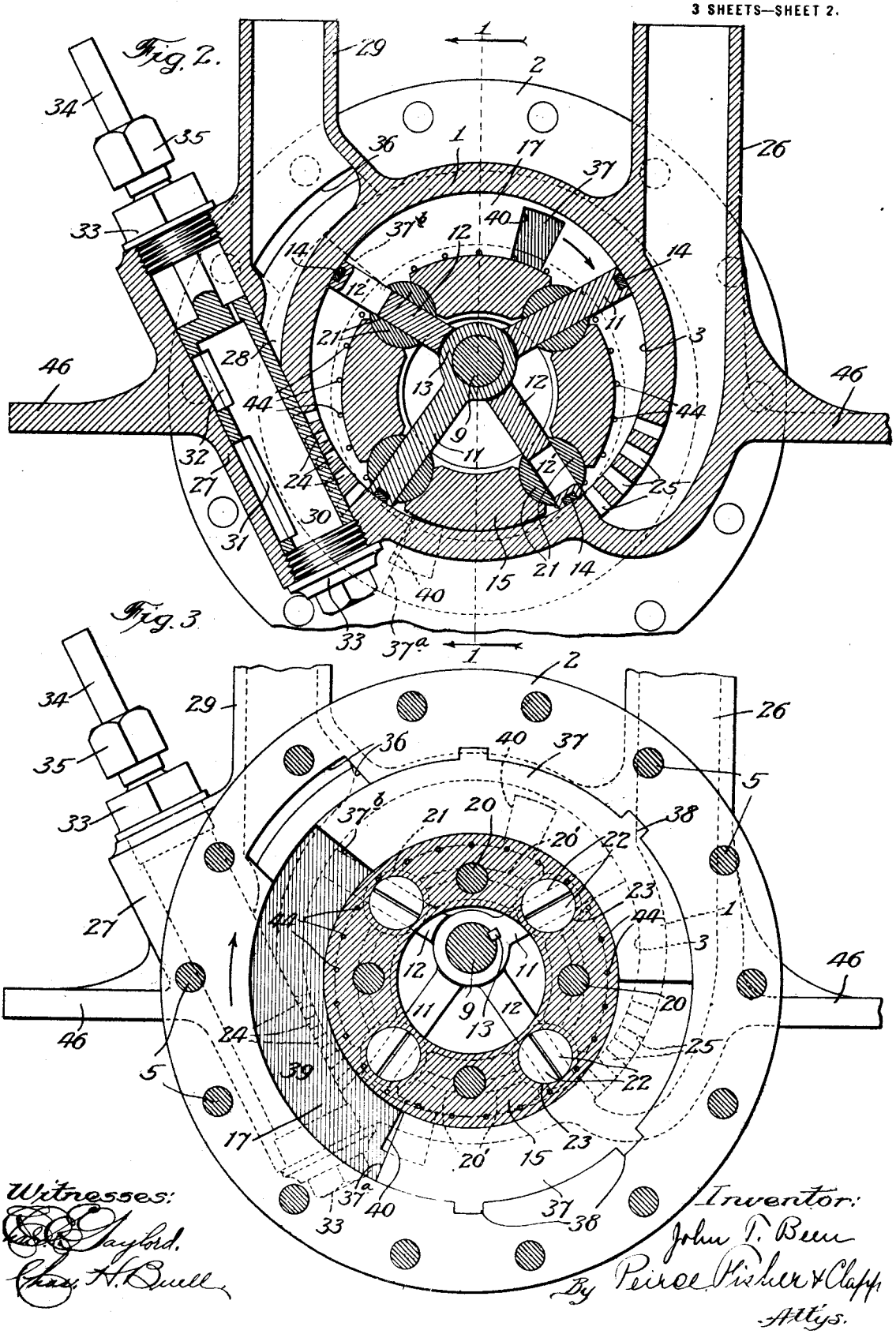

J. T. BEEN.
ROTARY ENGINE.
APPLICATION FILED DEC. 18, 1913.

1,176,643.

Patented Mar. 21, 1916.
3 SHEETS—SHEET 3.

Witnesses:

Inventor:
John T. Been
By Peirce, Fisher & Clapp
Attys.

UNITED STATES PATENT OFFICE.

JOHN T. BEEN, OF CALUMET, MICHIGAN.

ROTARY ENGINE.

1,176,643.  Specification of Letters Patent.  Patented Mar. 21, 1916.

Application filed December 18, 1913. Serial No. 807,510.

*To all whom it may concern:*

Be it known that I, JOHN T. BEEN, a citizen of the United States, and a resident of Calumet, county of Houghton, and State of Michigan, have invented a certain new and useful Improvement in Rotary Engines, of which the following is a full, clear, and exact description.

My invention relates to improvements in rotary engines and has for its object to improve upon the general construction of devices of this class to such an extent as to provide a machine which, although being compartively simple and inexpensive, will be highly efficient and durable and will possess a number of advantageous characteristics.

With this general object in view, the invention resides in certain novel features of construction hereinafter fully described and particularly pointed out in the claims.

Figure 1:
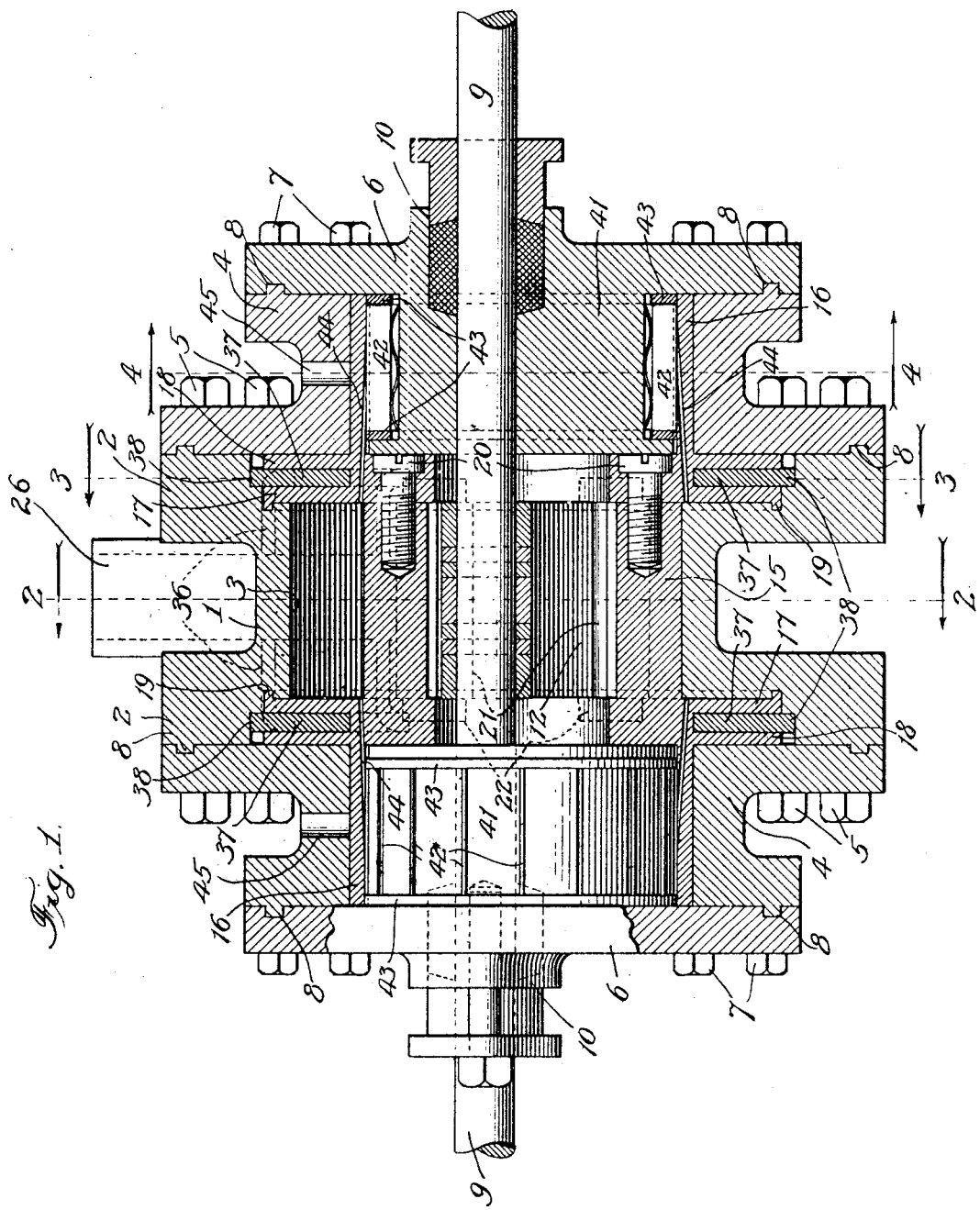
Figure 4:
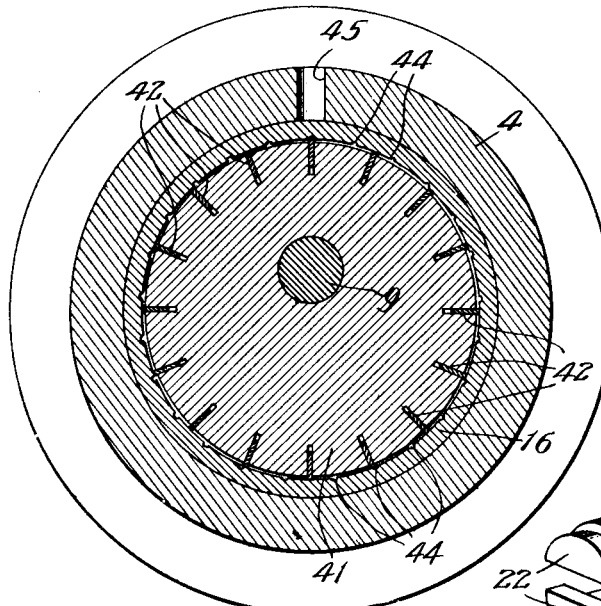
Figure 6:
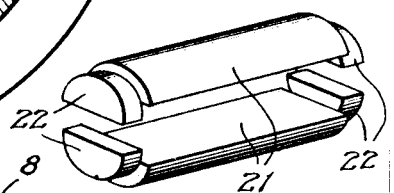
Figure 5:
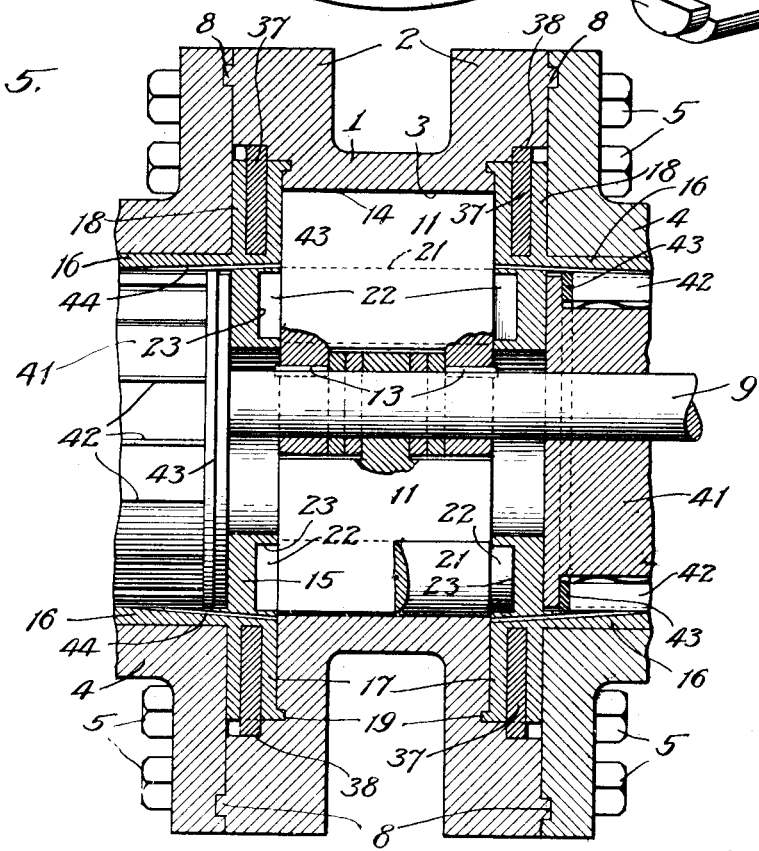

In the drawings, Figure 1 is a longitudinal section of the improved rotary engine. Figs. 2, 3 and 4 are cross-sections on the lines 2—2, 3—3 and 4—4, respectively, of Fig. 1. Fig. 5 is a partial longitudinal section similar to Fig. 1, but with two of the blades shown in vertical position. Fig. 6 is a detail perspective view of one of the oscillating guides for the blades.

The engine casing or cylinder 1 is provided with heavy end flanges 2 and with a bore 3, the surface or wall of which is cylindrical throughout. Heads 4 are secured to the cylinder ends by bolts 5, and cap-pieces 6 are secured to the flanged ends of the heads 4 by bolts 7. Packing ribs 8 on the flanges 2 of the cylinder engage grooves formed in the inner faces of the heads 4.

One or more blades or wings are mounted within the cylinder upon a concentric axis with the ends of the blades in engagement with its cylindrical bore. Preferably, these blades are mounted upon the engine shaft 9 which is concentric with the bore of the cylinder and which extends through and is journaled in suitable bearings in the cap-pieces 6. The cap-pieces are provided with stuffing boxes 10 about the shaft 9. In the preferred form shown, two piston or motor blades 11 and two intermediate packing blades 12 are mounted upon the engine shaft 9 within the cylinder and one of the piston blades is rigidly fixed to a shaft in any suitable manner as, for example, by means of pins 13. The ends of each of the blades are provided with suitable packing strips 14 which are maintained in constant engagement with the bore or wall of the cylinder as the blade rotates with the engine shaft. The piston or motor blades 11 are imperforate, but the intermediate packing blades 12 are provided with large openings 12' through which, when the openings are uncovered, the steam or other motive fluid may freely pass to equalize the pressure on opposite sides of the packing blades.

A cylindrical annular rotor 15 is eccentrically mounted within the cylinder with its surface in tangential contact with the cylinder bore at one point and preferably at the lower side of the cylinder. In the preferred embodiment of the invention, this rotor is idle, that is to say, it is not directly fixed upon the engine shaft. It is rotatably supported in position by laterally projecting, cylindrical end flanges or rings 16 which are fixed to the rotor and journaled within bores formed in the cylinder heads 4. The flanges or rings 16 and the bearings therefor are concentric with the rotor 15 and are, of course, eccentric to the cylinder bore. The rotor is also provided at its ends and at the inner ends of the rings or flanges 16, with radial, inner and outer flanges 17 and 18. The end faces of the cylinder flanges 2 are provided with recesses eccentric to the bore thereof for receiving the radial end flanges 17 and 18 of the rotor. The inner flanges 17 abut against the side faces of these recesses and the outer flanges 18 abut against the inner faces of the heads 4. Preferably, as shown, the inner flanges 17 are provided at their edges with packing ribs 19 which enter grooves formed in the body of the cylinder 1. Preferably, as shown, one of the cylindrical flanges or rings 16 and one pair of radial flanges 17 and 18 are formed integral with the body of the rotor 15, while the other set of flanges 16, 17 and 18 are formed of another casting which is secured to the main body of the rotor by heavy machine screws 20 and by interlocking tongues and grooves 20'.

The annular body of the rotor is provided with openings through which the blades 11 and 12 extend and suitable oscillating packing guides for the blades are arranged within these openings. Each packing guide preferably comprises two semi-cylindrical members 21 which fit within correspondingly shaped seats formed in the rotor 15 and which are provided with opposing flat faces for engaging the opposite side faces of the blade. The packing guide members 21 are provided with reduced, semi-cylindrical end portions 22 (see Figs. 5 and 6) which fit within seats 23 formed in the end portions of the rotor.

In the form shown, the flanges 16, 17 and 18 at the left hand end of the rotor are integral with the main body thereof. In assembling the engine, these parts of the rotor are first inserted into the left hand end of the engine cylinder. The left hand head 4 and cap-plate 6 are then secured in position. The blades 11 and 12 are then placed upon the engine shaft 9 and the guide members 21 are placed upon the blades. These parts are then inserted into the right hand end of the cylinder with the blades and guides arranged within the openings formed therefor in the rotor. The separate, right hand end portion of the rotor is then secured in position and the right hand cylinder head 4 and cap piece 6 are bolted in place.

The wall of the cylinder 1 is provided on opposite sides of the tangent point between the cylinder and the rotor, with inlet and exhaust ports 24 and 25, which preferably comprise a series of openings to provide ample port area without weakening the cylinder wall. The exhaust ports 25 communicate with the bore of an exhaust pipe 26 which is cast integral with the cylinder 1. The inlet ports 24 communicate with the cylindrical bore of a valve casing 27 which is provided with a port 28 that is in communication with an inlet pipe 29. The valve casing 27 and inlet pipe 29 are also cast integral with the cylinder 1. A hollow cylindrical valve 30 is rotatably mounted in the casing 27 and is provided with ports 31 and 32 which are adapted to register respectively with the inlet ports 24 and the port 28, to thereby admit steam or other motive fluid directly from the pipe 29 to the engine cylinder. By rotating the valve to the position shown in the drawings, communication between the inlet ports 24 and the steam inlet pipe 29 is cut off. Plugs 33 are threaded into the ends of the bore of the valve casing 27 and the valve is provided with a stem 34 extending through a stuffing box 35 on one of the plugs and by which the valve may be rotated.

The cylinder 1 is provided with passages 36 which lead laterally from the steam inlet pipe 29 (see Figs. 1, 2 and 3) into the annular spaces between the radial end flanges 17 and 18 of the rotor. Segmental filler blocks 37 are arranged in these annular spaces, as most clearly shown in Figs. 1 and 3. These blocks are fixed to the cylinder, preferably by means of lugs 38 thereon arranged within suitable seats in the cylinder. These filler blocks occupy the greater portion of the annular space between each pair of flanges 17 and 18, but leave a segmental space 39 between the end edges 37ᵃ and 37ᵇ thereof, to which steam or other motive fluid under pressure is admitted from the inlet pipe 29 and ports or passages 36. Each inner flange 17 of the rotor is provided with an admission port or ports 40. In the form shown, each flange 17 of the rotor is provided with two diametrically opposed ports 40 which are arranged behind the two imperforate piston blades 11.

In operation, if the steam or other motive fluid is to be used expansively, the valve 30 is turned to close the admission ports 24 and steam is admitted to each of the piston blades 11 from the segmental space 39 through the ports 40. In the position shown in Figs. 2 and 3, one pair of ports 40 in the inner flanges 17 of the rotor have just passed the edges 37ᵃ of the segments 37, so that steam under pressure is admitted through these ports and behind the adjacent piston blade 11. As the piston blades and rotor revolve in the direction indicated by the arrows in Figs. 2 and 3, the ports 40 are moved across the segmental spaces 39 and as soon as they pass the opposite end edge 37ᵇ thereof, the steam or other motive fluid under pressure is cut off. From this point, the steam acts expansively upon the blade, until the latter uncovers the exhaust ports 25. The inner ported flanges of the rotor thus form, in effect, rotary valves for admitting and cutting off the supply of steam to the piston blades to thereby effect the expansive operation of the steam upon the blades. The cut-off is positively effected and is not dependent upon its operation upon cams, gears, eccentrics or the like. Furthermore it will be apparent that the cut-off may be had at any desired point with respect to the stroke of the piston blades 11 by changing the lengths of the segmental filler blocks 37, that is to say by removing the filler blocks shown and described and substituting others which may be longer or shorter as the case might be.

If desired, steam may be admitted to each of the piston blades 11 during its full stroke by turning the valve 30 to connect the inlet ports 24 to the admission pipe 29. Furthermore, by positioning the valve 30 to open the ports 24 and by admitting steam to the pipe 26, the direction of rotation of the engine may be readily reversed.

The pressure of the steam upon the opposite inner end flanges of the rotor balances the latter against axial thrusts. Suitable means are also provided in connection with the cylindrical end rings or flanges 16 of the rotor for balancing the radial or side pressure upon the rotor. For this purpose, the cap-plates 6 are provided with integral, cylindrical plugs 41 which extend within the ring flanges 16. The peripheral surfaces of the plugs 41 are arranged closely adjacent the inner surfaces of the ring 16 and are provided with a circumferential series of pockets. These pockets are preferably formed by a series of axially extending packing strips 42 arranged in radial grooves in the plugs 41 and extending between packing strips 43 arranged in circumferential grooves in the plugs. These strips are preferably spring-pressed into contact with the inner surfaces of the rings 16. The rotor is provided at each end with a circular series of ports or passages 44 which extend from the space between the rotor and the cylinder into the pockets formed between the blocks 41 and the rings 16. The spaces in the pockets formed between the balancing rings or flanges 16 by the packing rings are thus at all times in communication with the space between the main body of the rotor and the cylinder 1. The pressure therefore within the pockets and against the inner faces of the ring 16 will counter-balance the side pressure of the steam or other motive fluid on the outer face of the main body of the rotor. This counter-balancing action moreover is effective throughout the entire periphery of the rotor, since the pressure against the outer face of the rotor at any point will be the same as and will be exactly counter-balanced by the pressure within the corresponding pockets in axial alinement therewith. The rotor, as stated, is not fixed to the engine shaft, but is free to float in its bearings, and operates with a minimum amount of friction because of the counter-balancing means for the rotor. The packing guide members 21 close the ports or openings 12' in the packing blades 12 as the latter pass from the exhaust port 25 to the inlet port 24, and each packing blade cuts off the exhaust port 25 before steam or other motive fluid is admitted to the preceding piston or motor blade. In this way, leaking from the inlet to the exhaust between the tangential point of contact of the rotor and cylinder is prevented. For this reason, it is not necessary that the rotor be positioned with absolute accuracy in the cylinder, and any breaking of the tangential contact between the rotor and the cylinder due to wear is immaterial. The packing strips 14 in the ends of the blades moreover will take up any wear of the blades on the cylinder and any variations due to slight inaccuracies in positioning the engine shaft. It should also be noted that, inasmuch as the blades are mounted upon a concentric axis and the engine bore is cylindrical throughout, the blades are maintained at all times in contact with the surfaces of the cylinder, so that no blows between these parts can occur.

As the packing blades pass beyond the admission ports 24, the openings 12' therein are uncovered, so that the steam or other motive fluid is free to pass therethrough and equalize the pressure upon opposite sides of these blades. These intermediate blades 12 therefore act solely as a means for preventing leaking of the steam between the admission and exhaust ports and obviate the necessity of a snug steam tight contact between the eccentric rotor and the wall of the cylinder. For this reason, and since it is counterbalanced and free to float in its bearings, the rotor revolves with little friction. It should also be noted that there are few reciprocating parts and that the friction thereof and of the other moving parts is slight.

The heads 4 are provided with oiling openings 45 leading to the bearings of the rotor. The cylinder 1 is provided with laterally projecting supporting brackets 46.

While the rotor 15 is free to float in its bearings independently of the engine shaft 9, it is connected to the shaft to revolve therewith by one of the motor blades 11 which is keyed to the shaft. The packing blades 12 and the second motor blade 11 are loose on the shaft and the pressure of the steam applied to the second motor blade is transmitted to the shaft through the medium of the rotor and the other motor blade that is fixed to the shaft.

It is obvious that changes may be made in the details set forth without departure from the essentials of the invention as defined in the claims.

I claim as my invention:—

1. A rotary engine comprising a cylinder, a concentric engine shaft, an eccentric rotor within said cylinder and tangent at one point to the wall thereof, a pair of imperforate motor blades and a pair of intermediate packing blades having openings therein, said blades being mounted on said shaft and one of said blades being affixed thereto, said cylinder having inlet and exhaust ports on opposite sides of said tangent point, oscillating packing guides for said blades mounted on said rotor and arranged to close the openings of said packing blades as the latter pass from said exhaust port to said inlet port, laterally extending annular members affixed to the extremities of said rotor, each of said members having therein a chamber, means for conducting motive fluid to said chambers, and additional means for establishing communication between the respective chambers in said annular members and the interior of said cylinder, substantially as and for the purpose set forth.

2. A rotary engine comprising a cylinder, a concentric engine shaft, an eccentric rotor within said cylinder, a series of blades mounted on said shaft and extending through said rotor into engagement with the walls of said cylinder, one of said blades being affixed to said shaft, a pair of laterally extending annular flanges secured to each extremity of said rotor, the members of each pair of said flanges being arranged in spaced relation, whereby to form an annular chamber, means for partially filling said chambers whereby to form a motive fluid compartment between the members of each pair of said flanges, means for conducting motive fluid to said compartment, and additional means for establishing communication between said compartments and the interior of said cylinder, substantially as and for the purpose set forth.

3. A rotary engine comprising a cylinder, a concentric engine shaft, an eccentric rotor within said cylinder, a series of blades mounted on said shaft and extending through said rotor and into engagement with the wall of said cylinder, one of said blades being affixed to said shaft, a pair of annular laterally extending flanges affixed to each extremity of said rotor, the members of each pair of said flanges being disposed in spaced relation, filler blocks disposed between the members of each pair of said flanges and partially occupying the space between the same to form a motive fluid compartment, means for conducting motive fluid to said compartment, and additional means for establishing communication between said compartments and the interior of said cylinder substantially as and for the purpose set forth.

4. A rotary engine comprising a cylinder, a concentric engine shaft, an eccentric rotor within said cylinder, a series of blades on said shaft and extending through said rotor and into engagement with the wall of said cylinder, one of said blades being fixed to said shaft, a pair of annular laterally extending flanges secured to each extremity of said rotor, the members of each pair of said flanges being arranged in spaced relation, segmental filler blocks disposed between the members of each pair of said flanges, said filler blocks only partially occupying the space intermediate the members of the respective pairs of flanges, whereby to form a motive fluid compartment, the inner member of each pair of said flanges having therein an opening whereby at predetermined times communication may be established between the motive fluid compartment and the interior of said cylinder, substantially as and for the purpose set forth.

5. A rotary engine comprising a cylinder, a concentric engine shaft, an independent eccentric rotor within said cylinder and tangent at one point to the wall thereof, said cylinder having inlet and exhaust ports on opposite sides of said tangential point, a pair of imperforate motor blades and a pair of intermediate packing blades having openings therein, said blades being mounted on said shaft, and one of said blades being fixed thereto, a pair of annular laterally extending flanges secured to each extremity of said rotor, the members of the respective pairs being arranged in spaced relation, segmental filler blocks arranged intermediate the members of each pair of said flanges, said filler blocks partially occupying the space between the members of each of said flanges, whereby to form a motive fluid compartment, and means for conducting the motive fluid compartment to the interior of said cylinder at predetermined times, substantially as and for the purpose set forth.

6. In a rotary engine, the combination of a cylinder, a rotating member disposed concentrically therein, a plurality of imperforate blades radiating from said rotating member and contacting with the cylinder, additional and apertured blades disposed between the other blades and likewise extending from the rotary member into contact with the cylinder, and an eccentrically positioned rotatable ring having blade guides through which the blades slide as the aforesaid member rotates, whereby to intermittently close and expose the apertures in the additional blades for the purpose specified.

7. In a rotary engine, the combination of a cylinder, a rotatable power shaft passing concentrically therethrough, a plurality of blades radiating from the shaft, contacting with the cylinder, and having bearings loosely receiving the shaft therein, an additional blade keyed to the shaft and extending therefrom to the cylinder, and a ring-shaped rotor loosely encircling the shaft, disposed eccentrically in the cylinder, and having guides through which the blades pass slidably.

8. In a rotary engine, the combination of a cylinder having its opposite ends closed by cylinder heads having therein inwardly opening cylindrical cavities, a pair of axially alined cylindrical journals projecting from the cylinder heads into the aforesaid cavities, said journals having on their peripheries a series of circumferentially spaced fluid receiving pockets, a rotor in the cylinder having sleeves projecting from its ends into the cavities and surrounding the journals, means for admitting motive fluid into the cylinder, and ports for conducting some of such fluid into the pockets.

9. In a rotary engine, the combination of a cylinder having its opposite ends closed by cylinder heads having therein inwardly opening cylindrical cavities, a pair of axially alined cylindrical journals projecting from the heads into the aforesaid cavities, said journals each having in its periphery a pair of parallel circumferentially extending grooves and a plurality of parallel longitudinally disposed grooves communicating at their ends with the first named grooves, packing rings in the circumferentially extending grooves, spring pressed shoes in the longitudinally disposed grooves abutting said rings, a rotor in the cylinder having sleeves projecting from its ends into the cavities and surrounding the journals therein, means to admit motive fluid into the cylinder, and ports for conducting some of such fluid into the spaces between the packing rings and shoes.

JOHN T. BEEN.

Witnesses:
 ANDREW G. GUTTBERG,
 WILLIAM M. HARRIS.